United States Patent [19]

Ren

[11] Patent Number: 4,736,654

[45] Date of Patent: Apr. 12, 1988

[54] TRANSMITTING UNIT

[75] Inventor: Zhu S. Ren, Shipailing, China

[73] Assignee: Hubei Institute of Machinery, Wuhan, China

[21] Appl. No.: 42,609

[22] Filed: Apr. 23, 1987

Related U.S. Application Data

[63] Continuation of Ser. No. 845,296, Mar. 28, 1986, abandoned.

[30] Foreign Application Priority Data

Apr. 1, 1985 [CN] China .................................. 85200923

[51] Int. Cl.[4] ............................................ F16H 25/06
[52] U.S. Cl. .......................................... 74/804; 74/805
[58] Field of Search ............................ 74/798, 804, 805

[56] References Cited

U.S. PATENT DOCUMENTS

| 2,508,121 | 5/1950 | McIver | 74/805 |
| 2,874,594 | 2/1959 | Sundt | 74/805 |
| 3,468,175 | 9/1969 | Rabek | 74/63 |
| 3,852,998 | 12/1974 | Leeson | 74/805 |

FOREIGN PATENT DOCUMENTS

| 471170 | 2/1929 | Fed. Rep. of Germany | 74/804 |
| 3006787 | 8/1981 | Fed. Rep. of Germany | 74/804 |
| 167164 | 5/1959 | Sweden | 74/805 |
| 1204466 | 9/1970 | United Kingdom | 74/805 |

Primary Examiner—Rodney H. Bonck
Assistant Examiner—David A. Testardi
Attorney, Agent, or Firm—Armstrong, Nikaido, Marmelstein & Kubovcik

[57] ABSTRACT

A transmitting unit used for the transmission with a fixed transmission ratio. The external shape is similar to ordinary rolling bearings performs transmission with reduction of speed or increase of speed in a clockwise or counterclockwise direction, the input and output shafts being on the same axis. The transmitting unit comprises a dual eccentric sleeve, a transmitting race with equally divided radial grooves, with transmitting rods enclosing rolling members at both ends so that each covered length equals the radius of a rolling member, an internal gear race and rolling bearings. The transmission bearing can be installed in the main machine and no transmission cases are needed. It may also be installed as a generally used variable speed transmission mechanism, and can be used in industries requiring the use of various transmission mechanisms with fixed transmission ratios.

6 Claims, 2 Drawing Sheets

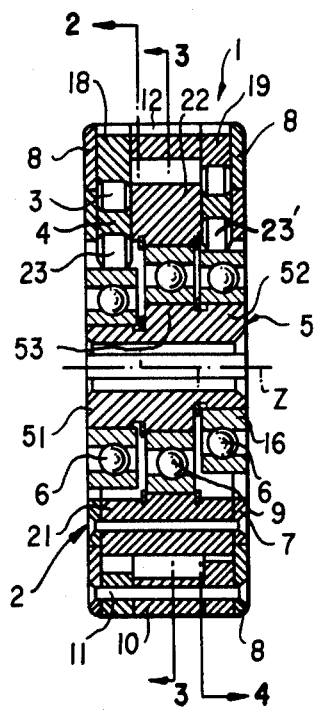
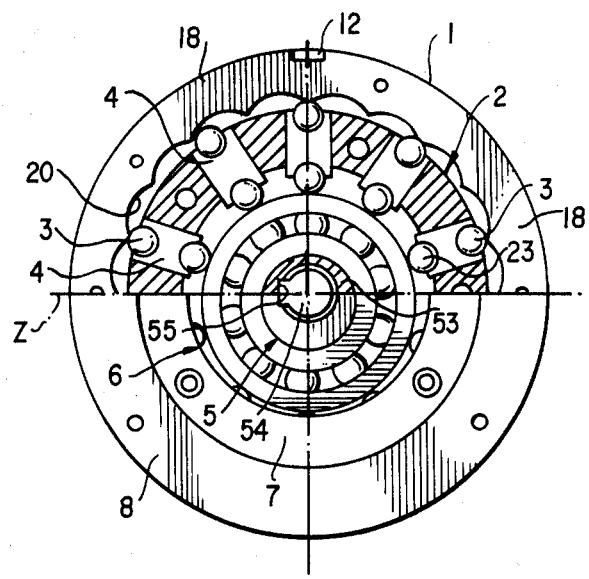

TRANSMITTING UNIT

This application is a continuation of application Ser. No. 845,296, filed Mar. 28, 1986, and now abandoned.

FIELD OF THE INVENTION

This invention relates to a mechanical transmission unit in which the input shaft and output shaft are on the same axis and can be used to reduce or to increase the rotational speed in both direction, i.e., clockwise or counterclockwise.

BACKGROUND OF THE INVENTION

In order to realize a coaxial transmission with a fixed transmission ratio, especially a transmission with a relatively large single stage transmission ratio, it is generally known to design an epicyclic gearing transmitting units with a fixed transmission ratio. In an ordinary epicyclic gearing mechanism, the design is limited by the conditions of transmission ratio, conditions of concentricity, conditions of assembling, conditions of adjacency, and the efficiency of the transmission.

In order to overcome the disadvantages of ordinary epicyclic gearing, epicyclic gearing of cycloid needle type have been proposed; but this requires special output mechanism, high precision work and is inconvenient in maintenance and repairing work. Moreover, the bearing of the epicyclic gear is under high stress and because of the limitation in design structure, larger bearings can not be used. In FIGS. 10 and 11 of U.S. Pat. No. 3,468,175, a transmission unit with a relatively large single stage transmission ratio and without the usual epicyclic gearing mechanism is disclosed. Thus the possibility to solve the above problems is offered. But in the structure of such patent there still exist, among others, the following problems: low transmission efficiency; heat is easily produced in the cam and the rolling member in meshing contact with the cam; and, in the meshing contact of the rolling member and the internal gear race, early wear of the guide groove, the roller member and the internal gear race produces additional heat during meshing. The main causes of those problems are (a) the linear speed of the meshing contact of the high speed cam and of the rolling member on the transmitting race is too high, (b) the rolling member and the guide groove i the radial direction of the transmitting race are in direct contact; when the rolling member is in radial motion at remote center position, there is some displacement of the contact position of the rolling member and the guide groove and displacement of the meshing position of the rolling member and the internal gear race. If the relative motion between the rolling member and the guide groove is pure rolling then the rolling member should have rotation in clockwise direction. If the relative motion between the rolling member and the internal gear race is pure rolling, then the rolling member should have in rotation the counterclockwise direction. However, the same rolling member cannot have clockwise and counterclockwise rotation simultaneously. Thus, this rolling member can be neither normal rolling nor normal sliding.

SUMMARY OF THE INVENTION

It is known that a transmission box is required in all transmitting units which transmit rotational speed.

The purpose of this invention is to provide a transmission with a relatively large single stage transmission ratio without any of the usual epicyclic gearing mechanism and at the same time overcome the problems of heat production in meshing operations and early wear of the guide groove, to increase transmission efficiency, and to increase the size of the working bearings, thus increasing its life. The manner of the assembly is the transmission mechanism of the usual rolling bearing, i.e. transmission bearing. Thus, the instant invention offers standard parts to replace conventional parts of a transmission box.

In this invention, two rolling bearings are installed on the dual eccentric sleeve to mesh with the rolling member on the transmitting rod. Transmitting rod 4 encloses rolling member 3 to such an extent that the covered length equals the radius of rolling member 3 or exceeds this length so that there is no direct contact between the rolling member and the guide groove of the transmitting race. The transmitting rod and the guide groove are in surface contact. This solves the problem of early wear of the transmitting race. Because the transmitting rod and the rolling member have only radial motion, pure rolling is guaranteed when the rolling member is in meshing motion. The transmitting race is coaxial with the dual eccentric sleeve. Hence, enough space is provided for replacing the rolling bearing on the dual eccentric sleeve with a larger one. The outside shape of the body is like the usual rolling bearing, and can be installed directly into the main machine. No transmission cases are required. Thus in the situation of eliminating the use of the usual epicyclic gearing mechanism with a simple structure, a transmission which is coaxial, with a fixed transmission ratio, and with a greater scope of single stage transmission ratio is provided.

BRIEF DESCRIPTION OF THE DRAWINGS

The instant invention will be more fully understood from the following description of a preferred embodiment of the invention taken with the appended drawings in which FIG. 1 is a cross sectional view of a variable speed transmission bearing according to the invention;

FIG. 2 is a side view, partly in section, at line 2, FIG. 1;

DESCRIPTION OF THE PREFERRED EMBODIMENT

Figure 3:
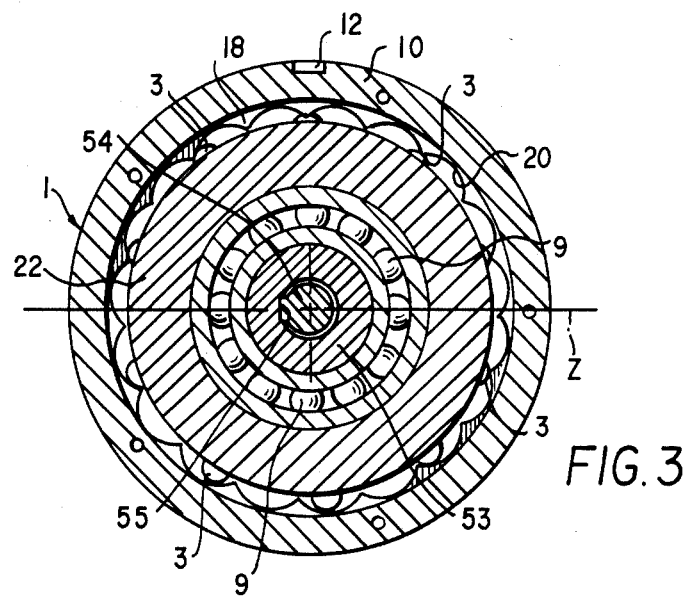
FIG. 3 is a sectional side view at line 3—3, FIG. 1.
Figure 4:
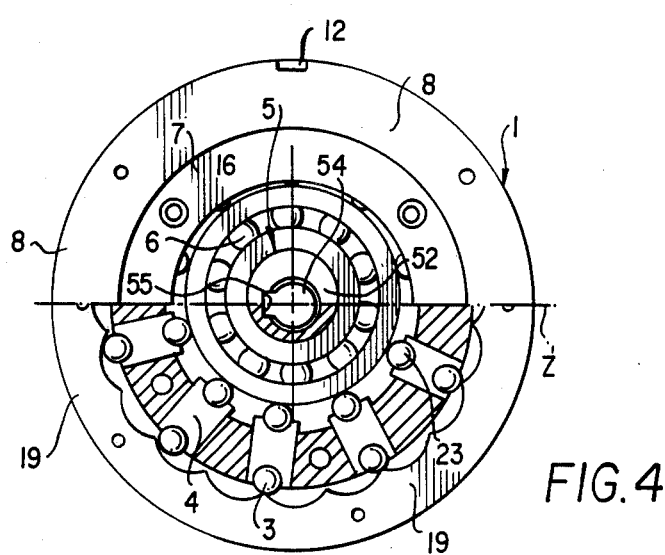
FIG. 4 is a side view, partly in section and similar to FIG. 1 but at line 4, FIG. 1.

In this invention, the detailed structure of the transmission bearing, with fixed transmission ratio is shown in FIGS. 1 to 4. Two coverplates 7 are riveted to the opposite faces of the unit with transmitting race 2 transmitting rods 4,4 and rolling members 3,3 therebetween. There is only radial motion, and no axial displacement of the transmitting rods 4,4 and rolling members 3,3 in the guide grooves of transmitting race 2. Coverplates 8,8 internal gear races 18, 19 and spacer-sleeve 10, which are riveted together. Therefore, the transmitting races 2, 2' can only rotate and have no axial displacement. Roller bearing 9 is mounted on concentric sleeve 53 of dual eccentric sleeve 5, connected with the high speed shaft 54 limits the axial displacement of dual eccentric sleeve 5 and supports transmitting race 2. On the dual eccentrics 51, 52 sleeve 5 and on the position of the guide grooves of transmitting race 2, there is also installed a rolling bearing 6, 6' which mesh with rolling member 23, 23' on transmitting rods 4, 4'. Thus, there is no direct contact between rolling members 3, 3' and high speed eccentrics 51, 52 of sleeve 5. Thus, the transmitting unit of the instant invention is shaped like an ordinary rolling bearing. The external diameter of the unit is the same as the external diameter of an internal gear race. Its dimensions can be that of the standard series of rolling bearings or can be of non-standard dimensions.

The transmission of the instant invention is described as follows: when internal gear races 18, 18' are stationary, if the dual eccentric sleeve 5 is driven in high speed, then the transmitting rods 4, 4' and the rolling members 3, 3 have radial motion in the guide groove of transmitting race 2, and the rolling member 3, 3' also rolls along the profile of the internal gear and the transmitting race 2 is rotated in low speed. According to the theory of relative motion: if any one of the three components—internal gear races 18, 18', transmitting race 2, and dual eccentric sleeves—is stationary, then the other two will be the driving and driven parts. Thus, by selecting the component to be stationary, one transmission unit can realize a transmission of reduction speed of 3 speed ratios and increasing speed of 3 speed-ratios.

The number of radial guide grooves of each row of transmitting race 2 is equal to the number of teeth of internal gear ± divided by one positive integer. Thus, let the number of teeth of the internal gear be $Za$, then the max number of transmitting rods 4, 4', $Zbmax = Za \pm 1$, then the transmitting ratio of reduction of speed which can be realized are respectively:

If internal gear races 18, 18' are stationary, $i = \pm Zbmax = Za \pm 1$

If the transmitting race 2 is stationary, $i = \pm Za$

If the dual eccentric sleeve 5 is stationary, $$i = \frac{Za + 1}{Za} \text{ (when } Zbmax = Za + 1\text{)}$$

$$i = \frac{Za}{Za - 1} \text{ (when } Zbmax = Za - 1\text{)}$$

In the case of increasing speed, the speed ratios are the reciprocals of those of the reduced speed.

The number of teeth of internal gear races 18, 18' are an odd number, from 5 to 69, and thus we can obtain a wide range of speed ratios of a single stage in reducing or increasing speed transmission.

The generating manufacturing process is used to make the teeth profile of the internal gear races 18, 18'.

Except for the cases of the transmission of very small power and rough requirements in transmission, in the axial direction there are two rows of internal gears 20, 20', in the internal gear races 18, 18' and they are staggered 180°. The eccentrics 51, 52 of the dual eccentric sleeve 5 are also staggered 180°. The transmitting race 2 has two sets of rows of guide grooves x, x' in the axial direction, and their positions are corresponding to those of internal gear races 18, 18' and dual eccentric sleeve 5, so that the stress is balanced at any instant and thus stable transmission is attained. At the same time, the loading action line of the bearings 6, 6' and 9 which are on the dual eccentric sleeve 5 is not static; and is favorable to increasing the working life of the bearings. On the outside circumference of the internal gear races 18, 18' and in the axial direction there is keyway 12 for connection and transmission. According to different power to be transmitted, a single key, double key, spline, etc. which are conventional standard parts, can be used. A drill hole or threaded hole in the end face of internal gear races 18, 18', can also be used for connection and transmission.

On the end faces of the transmitting race 2, there are holes or threaded holes 11 for connection and transmission. The transmitting race 2 has radial guide grooves x, x'; guide grooves x, x' and the coverplate 7 form a hollow space for transmitting rods 4, 4' to move radially without to rotation. The cross-section profiles of transmitting rods 4, 4' and guide grooves x of transmitting race 2 should be identical. The profile may be selected at random; but a rectangular cross-section is most commonly used. The transmitting rods 4, 4' and the guide grooves x of transmitting race 2 are in surface contact and thus a very heavy load can be carried. A rolling member such as rolling needles, can also be placed between the surfaces in contact to reduce friction. The transmitting race 2 and cover plates 7, 7', may also be made as a single body. One lateral side of grooves x open. The transmitting race 2 and the internal bore of dual eccentric sleeve 5 are coaxial and, therefore, there is enough space for larger rolling bearings 6, 6', on dual eccentric sleeve 5 eliminating the weak link which exists in other functioning bearings of the epicyclic gearing mechanism.

The ends of transmitting rods 4, 4' enclose rolling members 3, 3' to such extent that the covering length equals the radius of members 3, 3' or exceeds such radius. The radius of members 3, 3' form a plain surface tangent to a cylindrical surface. This favors the machining of the transmitting rod because it forms a separate structure of transmitting rods 4, 4' and the rolling member 3, 3'. It is the equivalent of a flexible link and, thus, it is not sensitive to errors in machining and therefore favors decrease in production costs.

The minimum number of guide grooves x, x' of the transmitting races 2, 2' is equal to 360° divided by number of teeth of internal gear races 18, 18', plus or minus 1. This number may be the integral multiple of the minimum inclined angle. If we select the suitable number of guide grooves x, x' during designing we can get more meshing points as well as sufficient strength of transmitting race 2.

The rolling member 3, 3', may be rollers or balls of rolling bearing which are standard parts.

There is a keyway in the internal bore of the dual eccentric sleeve 5 for connection and transmission. According to different requirements in power transmitted and types of connection such keyway may be a single key, double key or a spline.

In this invention, only the dual eccentric sleeve 5 is a high speed rotating part and is of a small mass. Moreover, the rolling bearings 6, 6' separate the high speed rotating dual eccentric sleeve 5 from the other parts. Thus, the rolling member has a low rotational speed, and the other rotating parts all have a low linear speed and low noise transmission are obtained. When used for transmission of increasing speed, a larger multiple of increasing speed is attained without difficulty in dynamic balancing.

When the transmission unit of this invention is used for reducing or increasing speed, the transmission unit is mounted in the machine and the use of a transmission case is not required. An installation hole is all that is required in the main machine. Thus, the layout design of the main machine is convenient. This also makes the structure simple and shortens the transmission chain. As a result, many high speed rotating parts in the main machine are eliminated and performance is improved. Moreover, by replacement of one transmission unit of this invention for another unit the specifications of the main machine can be changed without any change in structure.

The application and manufacture of transmission unit of this invention as a standard part provides the possibility to substitute different kinds of transmission units for transmission cases which are now widely used in many areas.

If the transmission unit of this invention is installed on an ordinary machine base and input and output shaft are added with keyways, holes or threaded holes for the purposes of connection and transmission; then a variable speed transmitting unit with an external shape of the horizontal or vertical type is provided. Moreover, the transmission unit of this invention can be directly connected with a D.C. or an A.C. motor. Therefore this kind of transmission unit can be used where transmission cases with fixed speed ratios are used, such as, food and chemical industries, light industry, construction, mining, textile and dyeing industries.

The transmission efficiency of this transmission bearing during reduction of speed is 90-94% and during increasing of speed, is somewhat lower by 2% to 4%.

What is claimed is:

1. A fixed speed ratio transmission unit comprising a dual eccentric sleeve connected to a shaft, a transmitting race having two axial ends and a pair of internal gear races, said dual eccentric sleeve having a first eccentric sleeve adjacent one of its axial ends on said shaft, a second eccentric sleeve adjacent the other of its axial ends on said shaft and a concentric sleeve therebetween, a roller bearing on said concentric sleeve, said roller bearing supporting said transmitting race on said concentric sleeve, a plurality of equally spaced radial guide grooves in said transmitting race, said equally spaced radial guide grooves include a first set of radial guide grooves adjacent one of the axial ends of said transmitting race and in radial alignment with said first eccentric sleeve of said dual eccentric sleeve and one of said pair of internal gear races and a second set of radial guide grooves adjacent the other of the axial ends of said transmitting race and in radial alignment with said second eccentric sleeve of said dual eccentric sleeve and the other of said pair of internal gear races, each of said radial guide grooves having a transmitting rod for radial movement therein, said transmitting rod having rollers at its opposite ends, said rollers at one of the opposite ends of the transmitting rods in said first set of radial guide grooves adjacent said one of the axial ends of said transmitting race arranged in force transmission with said radially aligned first eccentric sleeve of said dual eccentric sleeve and said rollers at the other of said opposite ends of said transmitting rods engaging said one of said pair of internal gear races, said rollers at one of the opposite ends of the transmitting rods in said second set of radial guide grooves adjacent said other of the axial ends of said transmitting race arranged in force transmission with said radially aligned second eccentric sleeve of said dual eccentric sleeve and said rollers at the other of the opposite ends of said transmitting rods in said second set of radial guide grooves engaging said other of said pair of internal gear races.

2. A transmission unit according to claim 1 characterized in that on an outside circumference of said internal gear races there is a keyway, and on an axial end face of said internal gear races there is a hole.

3. A transmission unit according to claim 1 characterized in that on an axial end face of said transmitting race there is a hole.

4. A transmission unit according to claim 7 characterized in that said first and second eccentric sleeve each has a roller bearing intermediate said rollers at said one end of said transmitting rods and said first and second eccentric sleeves, respectively.

5. A transmission unit according to claim 1 characterized in that the number of radial guide grooves in each of said first and second sets of grooves is equal to the number of races on said internal gear races plus 1 divided by a positive integer.

6. A transmission unit according to claim 1 characterized in that the said transmitting race has covers at axial opposite ends thereof and said internal gear races have covers at axial opposite ends thereof and said covers on said transmitting race are riveted to said axial opposite ends of said transmitting race to form a single body therewith and said covers on said internal gear races are riveted to the axial opposite ends of said internal gear races to form a single body therewith.

* * * * *